United States Patent
Mahlich

(10) Patent No.: US 9,445,687 B2
(45) Date of Patent: *Sep. 20, 2016

(54) BREWING OR PREPARATION CHAMBER FOR A BEVERAGE-MAKING MACHINE

(75) Inventor: Gotthard Mahlich, Kronberg im Taunus (DE)

(73) Assignee: Nestec S.A., Vevey (CH)

(*) Notice: Subject to any disclaimer, the term of this patent is extended or adjusted under 35 U.S.C. 154(b) by 366 days.

This patent is subject to a terminal disclaimer.

(21) Appl. No.: 13/696,213
(22) PCT Filed: May 4, 2011
(86) PCT No.: PCT/EP2011/057137
§ 371 (c)(1), (2), (4) Date: Jan. 14, 2013
(87) PCT Pub. No.: WO2011/138368
PCT Pub. Date: Nov. 10, 2011

(65) Prior Publication Data
US 2013/0167733 A1 Jul. 4, 2013

(30) Foreign Application Priority Data
May 6, 2010 (DE) .................... 20 2010 006 556 U

(51) Int. Cl.
*A47J 31/06* (2006.01)
*G07F 11/00* (2006.01)
(Continued)

(52) U.S. Cl.
CPC ............ *A47J 31/407* (2013.01); *A47J 31/3633* (2013.01)

(58) Field of Classification Search
CPC ............................ A47J 31/3633; A47J 31/407
USPC .......... 99/295, 279–284, 288, 289 R, 289 D, 99/289 P, 290, 302 R, 305, 316, 323, 99/323.3; 221/124, 131, 133, 193, 222, 221/238
See application file for complete search history.

(56) References Cited

U.S. PATENT DOCUMENTS 3,861,285 A * 1/1975 Martin .............................. 99/295
4,971,819 A * 11/1990 Miyahara ...................... 426/244
(Continued)

FOREIGN PATENT DOCUMENTS

DE 202010006556 8/2010
EP 0334572 9/1989
(Continued)

OTHER PUBLICATIONS

PCT International Search Report for Application No. PCT/EP2011/057137 with a Mailing Date of Jul. 29, 2011; 3 pages.
(Continued)

*Primary Examiner* — Dana Ross
*Assistant Examiner* — Ket D Dang
(74) *Attorney, Agent, or Firm* — K&L Gates LLP

(57) ABSTRACT

Brewing or preparation chamber (1) which is intended for a beverage-making machine and is suitable for accommodating, and extracting the contents from, a portion capsule (27, 29) which is filled with pulverulent or liquid basic beverage substances and consists fully or partially of electrically conductive material, and the brewing or preparation chamber (1) consists of a first, fixed-location chamber part (2), which is provided with opening means (25) for opening the portion capsule (27, 29) in relation to the beverage outlet and is connected in a fluid-channelling manner to a structure (6, 7, 8) for the outflow of the beverage, and of a second chamber part (3), which can be moved vertically or horizontally in relation to the first chamber part (2), is connected in a fluid-channelling manner, for the purpose of supplying the portion capsule (27, 29) with the extraction liquid, to an extraction-liquid-feeding extraction-liquid pump (37) and is provided with piercing means (11, 12) for opening the portion capsule (27, 29) and for channelling the extraction liquid into the portion capsule (27, 29), wherein the brewing or preparation chamber (1) is opened for the purpose of accommodating a portion capsule (27, 29) and is closed for the purpose of extracting the contents from the portion capsule (27, 29), characterized in that the first chamber part (2) or the second chamber part (3) contains, or the first chamber part (2) and the second chamber part (3) contain, electrically conductive contacts (13, 16, 19, 22) which are electrically insulated from one another and are the ends of an interrupted control circuit (30) of a checking and control device (34).

6 Claims, 2 Drawing Sheets

(51) Int. Cl.
*A47J 31/40* (2006.01)
*A47J 31/36* (2006.01)

(56) References Cited

U.S. PATENT DOCUMENTS

| | | | | |
|---|---|---|---|---|
| 5,055,312 | A * | 10/1991 | Hildebrand | A23L 3/005 |
| | | | | 219/771 |
| 6,026,732 | A | 2/2000 | Kolep | |
| 2005/0150391 | A1* | 7/2005 | Schifferle | 99/295 |
| 2005/0160919 | A1* | 7/2005 | Balkau | 99/279 |
| 2008/0245236 | A1* | 10/2008 | Ternite et al. | 99/295 |
| 2010/0037779 | A1* | 2/2010 | Pecci et al. | 99/289 R |
| 2010/0064899 | A1* | 3/2010 | Aardenburg | 99/295 |
| 2013/0327222 | A1* | 12/2013 | Mahlich | 99/295 |

FOREIGN PATENT DOCUMENTS

| | | |
|---|---|---|
| EP | 0449533 | 10/1991 |
| JP | 4224715 | 2/2009 |
| WO | 2008090122 | 7/2008 |
| WO | 2010092543 | 8/2010 |

OTHER PUBLICATIONS

Written Opinion of the PCT International Search Report for Application No. PCT/EP2011/057137 with a Mailing Date of Jul. 29, 2011; 7 pages.

Japan Office Action for Application No. P2013-508491, Dispatch No. 136609, dated Mar. 24, 2015, 4 pages.

* cited by examiner

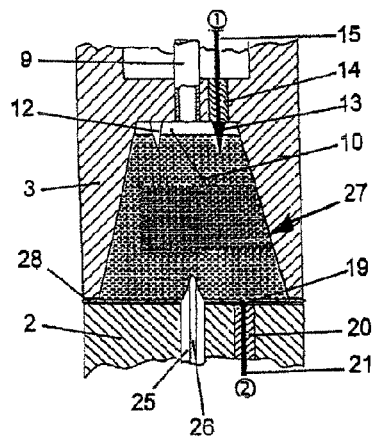
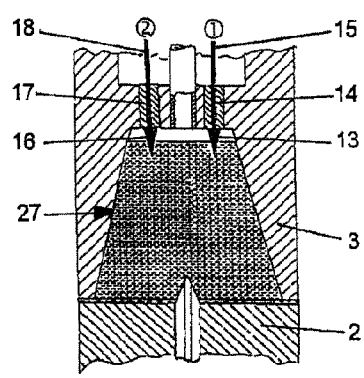
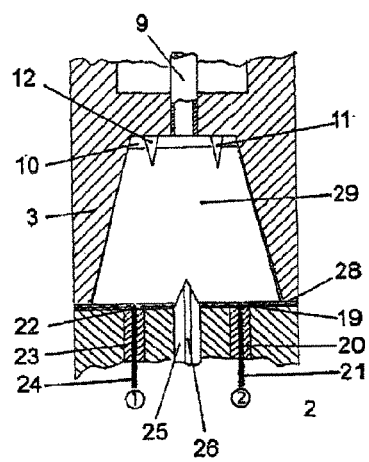
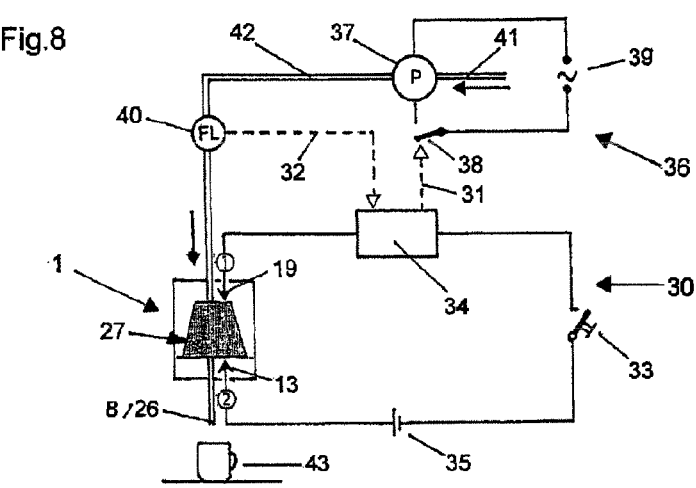

BREWING OR PREPARATION CHAMBER FOR A BEVERAGE-MAKING MACHINE

CROSS REFERENCE TO RELATED APPLICATIONS

The present application is a National Stage of International Application No. PCT/EP2011/057137, filed on May 4, 2011, which claims priority to German Patent Application No. 20 2010 006 556.9, filed on May 6, 2010, the entire contents of which are being incorporated herein by reference.

FIELD OF THE INVENTION

The invention relates to a brewing or preparation chamber of a beverage-making machine, which is suitable for accommodating, and extracting the contents from, a portion capsule which is filled with pulverulent or liquid beverage base materials.

BACKGROUND OF THE INVENTION

Beverage-making machines, in particular espresso machines, are increasingly being designed for the use of portion capsules which are filled with a certain quantity of pulverulent or liquid beverage base materials. The most common portion capsules here comprise either a cup which is deep-drawn from aluminium foil, and is closed in an air-tight and aroma-tight manner by a lid closure element made of aluminium foil, or a cup which is thermoformed from plastics material or a plastics-material cup which is produced by injection moulding, and is closed in an air-tight and aroma-tight manner by a lid closure element made of aluminium foil or plastics-material film.

The beverage-making machines which are suitable for accommodating, and extracting the contents from, such a portion capsule are provided with a brewing or preparation chamber which preferably comprises a fixed, first chamber part, which is provided with opening means for beverage-discharge purposes and is connected in a fluid-channelling manner to a structure for the outflow of the beverage, and also comprises a second chamber part, which can be moved horizontally or vertically in relation to the first chamber part, is connected in a fluid-channelling manner, in order for the portion capsule to be supplied with the extraction liquid, to an extraction-liquid-feeding subassembly and is provided with at least one piercing means for opening the portion capsule, and for the introduction of the extraction liquid into the portion capsule, wherein the brewing or preparation chamber is opened in order for a portion capsule to be accommodated and is closed in order for the portion capsule to have its contents extracted.

For the brewing operation, the piercing means penetrate into the portion capsule—either on the side thereof which is closed by the film or foil or on the base side thereof—and the extraction liquid, which is pumped under pressure into the brewing chamber, can flow into the portion capsule through the openings pierced by the piercing means. In order for the resulting beverage to drain out, the portion capsule, depending on the respective portion-capsule system, is opened on the side located opposite the extraction-liquid-feeding side. In the case of portion capsules which are produced from a plastics material and are closed by a plastics-material closure film or aluminium foil, this takes place by means of a portion-capsule-opening spike arranged on the base of the brewing or preparation chamber.

In the case of portion capsules which are produced from an aluminium foil and are closed by a lid closure element made of aluminium foil, the aluminium closure foil rests on the points of a pyramid plate arranged on the base of the brewing chamber and, by means of the pressure which is built up in the portion capsule by the extraction liquid flowing under pump pressure into the portion capsule, the aluminium closure foil is pushed against the pyramid points such that the foil is pierced by the pyramid points and the portion capsule is thus opened. The aluminium closure foil here is designed for a certain rupture pressure, as a result of which, prior to the pyramid points piercing through the closure foil, in particular for the preparation of an espresso, the coffee granules are subjected to optimum moistening and pressure action, which is essential for optimum crema formation, which is the marker of quality for a good espresso. Once the portion capsule has been opened, the coffee brew flows out of the brewing chamber via drainage channels.

In the case of brewing- or preparation-chamber systems which are designed for the use of portion capsules which consist of an aluminium foil and are closed by a lid closure element made of aluminium foil, there is a risk of use being made of system-incompatible portion capsules which consist, in full or in part, of plastics material, correspond to the configuration of the original portion capsule and are thus accepted by the accommodating device of the brewing or preparation chamber. The fact that the system-related construction of the brewing or preparation chambers for portion capsules consisting of an aluminium foil has to be different from that of brewing or preparation chambers for portion capsules consisting of non-metallic material means that the use of portion capsules which consist, in full or in part, of plastics material may result in considerable disruption to the operation of the beverage-making machine or in inferior preparation results.

SUMMARY

It is an object of the present invention for the brewing or preparation chamber which is suitable for accommodating a portion capsule which consists, in full or in parts of aluminium or an electrically conductive material to be provided with a checking and control device which accepts only portion capsules consisting in full or in part of aluminium foil or an electrically conductive material and which prevents a preparation cycle from taking place if use is made of a system-incompatible portion capsule consisting, in full or in part, of plastics material.

The object is achieved according to the invention by a brewing or preparation chamber having the features of the present disclosure.

This includes a brewing or preparation chamber which is formed from a first chamber part and a second chamber part, is suitable for accommodating a portion capsule consisting, in full or in part, of aluminium or an electrically conductive material and in its first and its second chamber parts, or only in the first chamber part or only in the second chamber part, is provided with electrically conductive contacts which are the ends of an interrupted control circuit for a checking and control device, and which are suitable for checking the compatibility of a portion capsule in relation to the brewing or preparation chamber.

The checking operation takes place by way of the following steps: the electric starting pulse for a beverage-preparation cycle is directed, via a control circuit, to a control device which, once activated, starts the preparation cycle, wherein this control circuit for the checking and control device runs via electrical contacts which are arranged in the first chamber part or in the second chamber part, or in the two chamber parts, of the brewing or preparation chamber, and are electrically insulated in relation to the brewing or preparation chamber, and it is closed only by means of a portion capsule which is located in the brewing or preparation chamber, and is fully or partially electrically conductive, in that, with the brewing or preparation chamber closed, the electrical contacts which are arranged in the first or second chamber part of the brewing or preparation chamber, these contacts being the ends of the interrupted control circuit of the control device, are in electrically conductive contact with the electrically conductive zones of the portion capsule, which are connected to one another in an electrically conductive manner.

BRIEF DESCRIPTION OF THE DRAWINGS

The invention will be illustrated hereinbelow by way of eight figures:

FIG. 5 shows schematically, and in partially cut-away form, a closed brewing or preparation chamber according to the invention comprising a first chamber part, having a portion-capsule-opening spike (25) with a beverage-drainage groove (26), and having an electrical contact (19), and also comprising a second chamber part, having an extraction-liquid-feeding arrangement with a first piercing means (12) and a second piercing means (13), designed as an electrical contact, and also having an electrically conductive portion capsule located in the brewing or preparation chamber, FIG. 6 shows schematically, and in partially cut-away form, a closed brewing or preparation chamber according to the invention comprising a first chamber part, having a portion-capsule-opening spike with a beverage-drainage groove, and also comprising a second chamber part, having an extraction-liquid-feeding arrangement and two piercing means (13, 16), designed as electrical contacts, and also having an electrically conductive portion capsule (27) located in the brewing or preparation chamber, FIG. 7 shows schematically, and in partially cut-away form, a closed brewing or preparation chamber according to the invention comprising a first chamber part, having two electrical contacts (19, 22) and having a portion-capsule-opening spike with a beverage-drainage groove, and also comprising a second chamber part, having an extraction-liquid-feeding arrangement and two piercing means (11, 12), and also having an electrically non-conductive portion capsule (29) with an electrically conductive lid closure element (28) located in the brewing or preparation chamber, and FIG. 8 shows, schematically, the electric circuit arrangement (30, 36) according to the invention for the checking and control device.

DETAILED DESCRIPTION

Figure 1:
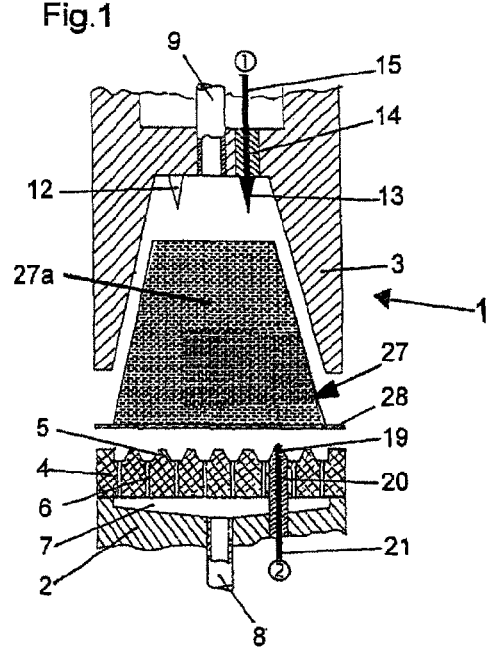
FIG. 1 shows schematically, and in partially cut-away form, an open brewing or preparation chamber (1) according to the invention comprising a first chamber part (2), having a pyramid plate (4) and an electrical contact (19) arranged therein, and having a beverage-drainage structure (6, 7, 8), and also comprising a second chamber part (3), having an extraction-liquid-feeding arrangement (9), having a first piercing means (12) and a second piercing means (13), designed as an electrical contact, and also having a fully electrically conductive portion capsule (27, 27a) located in the brewing or preparation chamber.
Figure 2:
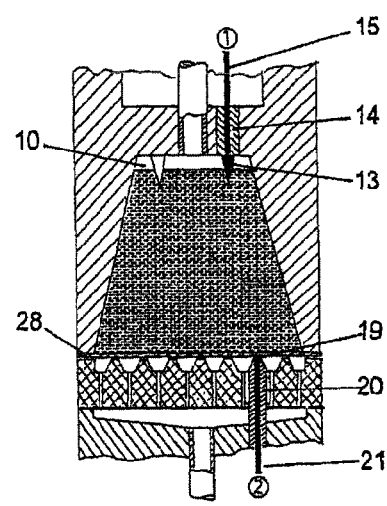
FIG. 2 shows schematically, and in partially cut-away form, the brewing or preparation chamber from FIG. 1 in the closed state with a fully electrically conductive portion capsule located in the brewing or preparation chamber.
Figure 3:
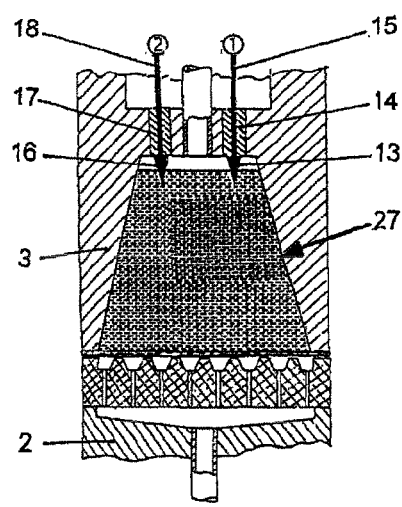
FIG. 3 shows schematically, and in partially cut-away form, a closed brewing or preparation chamber according to the invention comprising a first chamber part, having a pyramid plate with a beverage-drainage structure, and also comprising a second chamber part, having an extraction-liquid-feeding arrangement with two piercing means (16, 13), designed as electrical contacts, and also having an electrically conductive portion capsule (27) located in the brewing or preparation chamber.
Figure 4:
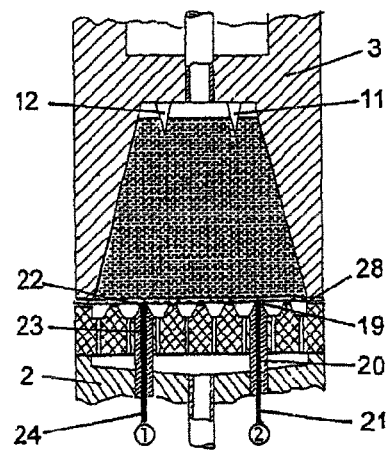
FIG. 4 shows schematically, and in partially cut-away form, a closed brewing or preparation chamber according to the invention comprising a first chamber part, having a pyramid plate with two electrical contacts (19, 22) arranged therein and with a beverage-drainage structure, and also comprising a second chamber part, having an extraction-liquid-feeding arrangement and two piercing means (11, 12), and also having an electrically conductive portion capsule (27) located in the brewing or preparation chamber.

In a first embodiment of the invention, in which the first chamber part (2) is provided with a pyramid plate (4), there is at least one piercing means (13), which is arranged in the movable, second chamber part (3) of the brewing or preparation chamber (1), is designed as an electrically conductive contact, is one end of the interrupted control circuit (30) for the control device (34) and is electrically insulated in relation to the second chamber part (3), and the pyramid plate (4), which is arranged in the first, fixed chamber part (2) of the brewing or preparation chamber (1) and has pyramid points (5) which serve for opening the portion capsule (27), contains at least one electrically conductive contact (19), which is electrically insulated in relation to the pyramid plate (4) and likewise forms one end of the interrupted control circuit (30) for the checking and control device (34). The portion capsule (27) located in the brewing or preparation chamber (1) has its electrically conductive lid closure element (28) resting on the electrical contact (19) of the pyramid plate (4), and the control circuit (30) for the checking and control device is closed as soon as the piercing means (13) of the second chamber part (3), upon closure of the brewing or preparation chamber (1), penetrates into the portion capsule (27) and thus the electrically conductive portion capsule (27) establishes the connection between the piercing means (13) of the second chamber part (3), this piercing means being designed as an electrical contact, and the contact (19) of the pyramid plate (4) of the first chamber part (3).

In a second embodiment of the invention, the movable, second chamber part contains at least two electrically conductive piercing means (18, 15) which are insulated electrically from one another and in relation to the second chamber part (3), both form in each case one end of the interrupted control circuit (30) and, as soon as they penetrate into the electrically conductive portion capsule (27) upon closure of the brewing or preparation chamber, close the control circuit (30) for the checking and control device (34) by means of the electrically conductive portion capsule (27).

In a third embodiment of the invention, the pyramid plate (4) of the first chamber part (2) contains at least two contacts (19, 22) which are electrically insulated from one another and in relation to the pyramid plate (4), each form one end of the interrupted control circuit (30) and on which, with the brewing or preparation chamber (1) closed, the electrically conductive lid closure element (28) of the portion capsule (27) rests and closes the control circuit (30).

In all three embodiments, a portion-capsule-opening spike (25) with a beverage-drainage groove (26) may be arranged, for the purpose of opening the portion unit (27, 29), in place of a pyramid plate in the first chamber part (2) of the brewing or preparation chamber (1).

For beverage-preparation purposes, a portion capsule (27, 29) is introduced into the open brewing or preparation chamber (1) and the brewing or preparation chamber is closed. As the chamber is being closed, the piercing means (11, 12, 13, 16) of the second chamber part (3) of the brewing or preparation chamber (1) penetrate into the portion capsule (27, 29), and the electrically conductive lid closure element (28) of the portion capsule (27, 29) rests on the electrical contacts (1) of the first chamber part (2). Depending on the respective embodiment of the brewing or preparation chamber (1), this means that, either by way of the electrical contacts (13, 19), which are arranged in the first chamber part (2) and second chamber part (3), or by way of the contacts (19, 22), which are arranged only in the first chamber part (2), or of the contacts (13, 16), which are arranged only in the second chamber part (3), the control circuit (30) for the control device (34) in the brewing or preparation chamber (1) is closed by means of the electrically conductive zones of the portion capsule (27, 29), these zones being in electrically conductive connection with one another. Then, by virtue of the starting contact (33) for beverage preparation being closed by the machine operator, the control circuit (30) for the control device (34) is closed, and the control device (34) transmits, via the starting-signal line (31), the starting signal for closing the starting contact (38), which closes the circuit (36) for the extraction-liquid pump (37), and beverage-preparation operation starts. The extraction liquid is pumped under pressure into the portion capsule (27, 29), via the extraction-liquid infeed (41) and the extraction-liquid line (42), through the openings pierced in the portion capsule (27, 29) by the piercing means (11, 12, 13, 16). In the case of a brewing or preparation chamber (1) provided with a pyramid plate (4), the pump pressure pushes the lid closure element (28) of the portion capsule (27, 29) onto the point (5) of the pyramid plate (4) to such a pronounced extent that these points pierce the lid closure element (28) and the beverage flows, through the drainage bores (6) of the pyramid plate (4), into a collecting space (7) and from the latter, via the beverage-drainage line (8), into a collecting vessel (43). In the case of a brewing or preparation chamber (1) having its first chamber part (2) provided with a portion-capsule-opening spike (25), the latter pierces the lid closure element (28) of the portion capsule (27, 29) and the beverage flows through the beverage-drainage groove (26) of the opening spike (25) into a collecting vessel (43).

The flowmeter (40), which is located in the extraction-liquid line (42), measures the quantity of extraction liquid flowing through and, when the pre-programmed quantity is reached, transmits a stopping signal, via the stopping-signal line (32), to the checking and control device (34), and the latter opens the circuit (36) for the extraction-liquid pump (37). The control circuit for the checking and control device may be both an a.c. circuit and a d.c. circuit.

The abovedescribed electric circuit arrangement for evaluating the control signal obtained by means of the electrical contacts of the first and second chamber parts and the conductive zones of the portion capsule constitutes just one of various possible evaluation circuits.

LIST OF DESIGNATIONS

1 Brewing or preparation chamber
2 First chamber part
3 Second chamber part
4 Pyramid plate
5 Pyramid points
6 Beverage-drainage bores
7 Beverage-collecting space
8 Beverage-drainage line
9 Extraction-liquid infeed
10 Extraction-liquid-distributing space
11 Piercing means
12 Piercing means
13 Piercing means as electrical contact
14 Piercing-means insulation
15 Electrical contact line
16 Piercing means as electrical contact
17 Contact insulation
18 Electrical contact line
19 Electrical contact, first chamber part
20 Contact insulation
21 Electrical contact line
22 Electrical contact, first chamber part
23 Contact insulation
24 Electrical contact line
25 Opening spike
26 Beverage-drainage groove
27 Portion capsule, electrically conductive
27a Portion capsule, electrically conductive zone
28 Lid closure element, electrically conductive
29 Portion capsule, electrically non-conductive
30 Control circuit for control device
31 Starting-signal line
32 Stopping-signal line
33 Starting contact
34 Checking and control device
35 Voltage source for the control device
36 Extraction-liquid-pump circuit
37 Extraction-liquid pump
38 Starting contact for the extraction-liquid pump
39 Voltage source for the extraction-liquid pump
40 Flowmeter
41 Extraction-liquid infeed
42 Extraction-liquid line
43 Collecting vessel

The invention claimed is:

1. A brewing chamber of a beverage-making machine, which is suitable for accommodating, and extracting the contents from, a portion capsule that is filled with pulverulent or liquid beverage base materials and comprises, in full or in part, electrically conductive material, the brewing chamber comprising:
    a fixed, first chamber part having an opener for opening the portion capsule for beverage-discharge purposes and connected in fluid communication to a structure for an outflow of the beverage; and
    a second chamber part that is movable horizontally or vertically in relation to the first chamber part, is connected in fluid communication to an extraction-liquid-feeding extraction-liquid pump, and comprises a piercing member for opening the portion capsule and for introducing the extraction liquid into the portion capsule, the brewing chamber is opened for the portion capsule to be received and is closed for the portion capsule to have its contents extracted, the first chamber part and the second chamber part respectively comprising first and second electrically conductive contacts that are electrically insulated from one another and are the ends of an interrupted control circuit of a checking and control device, wherein the piercing member located in the second chamber part is the second electrical contact, and wherein when the portion capsule is located in the closed brewing chamber, the first electrical contact of the first chamber part and the second electrical contact of the second chamber part are in electrically conductive contact with the portion capsule at least in an electrically conductive zone of the portion capsule, and the control circuit of the checking and control device is closed.

2. The brewing chamber of claim 1, wherein the opener is the first electrical contact.

3. The brewing chamber of claim 1, wherein the opener is positioned in the second chamber part.

4. A brewing chamber of a beverage-making machine that is suitable for accommodating, and extracting the contents from, a portion capsule that is filled with pulverulent or liquid beverage base materials and comprises, in full or in part, electrically conductive material, the brewing chamber comprising:

a fixed, first chamber part having an opener for opening the portion capsule for beverage-discharge purposes and connected in fluid communication to a structure for an outflow of the beverage; and a second chamber part that is movable horizontally or vertically in relation to the first chamber part, is connected in fluid communication to an extraction-liquid-feeding extraction-liquid pump and comprises a piercing member for opening the portion capsule and for introducing the extraction liquid into the portion capsule, the brewing chamber is opened for the portion capsule to be received and is closed for the portion capsule to have its contents extracted, the first chamber part and the second chamber part respectively comprising first and second electrically conductive contacts that are electrically insulated from one another and are the ends of an interrupted control circuit of a checking and control device, wherein the piercing member located in the second chamber part is the second electrical contact, and wherein when the portion capsule is located in the closed brewing chamber, the first electrical contact of the first chamber part and the second electrical contact of the second chamber part are in electrically conductive contact with the portion capsule at least in an electrically conductive zone of the portion capsule, the second electrical contacts of the second chamber part are in electrically conductive contact with the portion capsule with an electrically conductive lid closure element, the first electrical contacts of the first chamber part are in electrically conductive contact with the electrically conductive lid closure element, and the control circuit of the checking and control device is closed.

5. The brewing chamber of claim 4, wherein the opener is the first electrical contact.

6. The brewing chamber of claim 4, wherein the opener is positioned in the second chamber part.

* * * * *